Oct. 16, 1962

A. J. HUMPHREY 3,059,162

ELECTRIC MOTOR CONTROL SYSTEM

Filed Aug. 21, 1958

INVENTOR.
ANDREW J. HUMPHREY
BY Woodling and Krost,
attys.

Oct. 16, 1962                A. J. HUMPHREY                 3,059,162
                        ELECTRIC MOTOR CONTROL SYSTEM
Filed Aug. 21, 1958                                      4 Sheets-Sheet 2

INVENTOR.
ANDREW J. HUMPHREY
BY Woodling and Krost,
              attys.

United States Patent Office 3,059,162
Patented Oct. 16, 1962

3,059,162
ELECTRIC MOTOR CONTROL SYSTEM
Andrew J. Humphrey, Cleveland, Ohio, assignor to The Reliance Electric & Engineering Company, a corporation of Ohio
Filed Aug. 21, 1958, Ser. No. 772,644
20 Claims. (Cl. 318—197)

The invention relates in general to electrical control systems including electronic tubes or valves for controlling dynamoelectric machines.

Numerous electronic tube arrangements have been heretofore devised to control the speed of dynamoelectric machines including arrangements associated with alternating current motors of the induction type to control the speed of the induction motors. In some of these arrangements, the control of the speed has been obtained by varying the conductivities of the electronic tubes to control the amount and direction of energy transfer between a secondary winding of the motor and the alternating voltage terminals of a supply circuit. The induction motor utilizing a wound rotor is a rugged motor which will withstand considerable abuse and high speed, as well as rapid acceleration and deceleration. As such, the induction motor has many times in the past been attempted to be controlled in speed as a variable speed machine, but most of these systems have been extremely complex with the associated control circuit complex and costly. The result of these past schemes has been that due to the complexity, the systems have not come into commercial favor as has the variable speed direct current motor, even though alternating current is much more widely available throughout the world today.

Accordingly there has been evidence of a decided need for an improved and simplified electronic tube controlled induction dynamoelectric machine and more specifically a system for the control of induction motors which has a wide range of speed control, yet good torque characteristics.

It is an object of the invention to provide a new and improved control system for electronic tube translating apparatus.

It is another object of the invention to provide a new and improved circuit for an induction motor wherein part of the power which has been transferred across the air gap into the secondary is fed back into the power source.

Another object of the invention is to provide an induction motor control circuit wherein either the rotor or stator may serve as the primary and the other serve as the secondary winding.

Another object of the invention is to provide an induction motor control circuit with electronic tubes in both the rotor and stator circuits for operating either the rotor or the stator as the primary and hence to control the direction of rotation of the motor.

Another object of the invention is to provide an induction motor control system wherein full torque is obtained at locked rotor.

Another object of the invention is to provide an induction motor control system utilizing electronic tubes, which system is capable of developing torques comparable to an external resistance controlled wound rotor induction motor.

Another object of the invention is to provide an induction motor controlled circuit wherein full torque is available from stall to near synchronous speeds and two to three times full torque is available for acceleration.

Another object of the invention is to utilize an induction motor control circuit which does not require a variable frequency grid control system.

Another object of the invention is to provide a variable speed motor which does not require a commutator.

Another object of the invention is to provide a variable speed motor which has low starting currents.

Another object of the invention is to provide for the synchronous operation of a plurality of motors.

In accordance with the preferred embodiment of the invention, an electronic tube translating circuit is provided for control of an operating condition, such as speed, of a dynamoelectric machine of the induction type. A stator or primary winding of the dynamoelectric machine is connected to an alternating current circuit and the rotor or secondary winding is connected to the alternating current circuit through translating apparatus including electronic tubes. The electronic tubes are provided in pairs which are opposed relative to the alternating current line. The pairs of tubes are preferably connected one pair for each phase of the secondary winding, either single or multiphase. The electronic tubes are arranged to control the speed of the dynamoelectric machine from standstill to near synchronous speed by controlling the effective conduction of the tubes which controls the effective impedance of the secondary winding. The voltage induced into the rotor winding is permitted to oppose the line voltage so as to transmit power back to the alternating current line upon proper polarities of secondary and line voltages being obtained.

Other objects and a fuller understanding of the invention may be had by referring to the following description and claims taken in conjunction with the accompanying drawing, in which:

Figure 8:
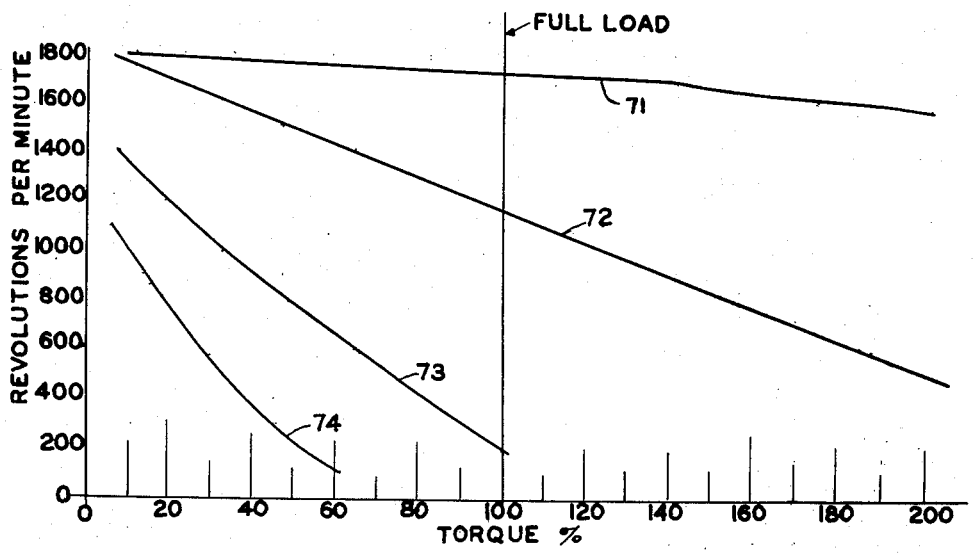
Figure 7:
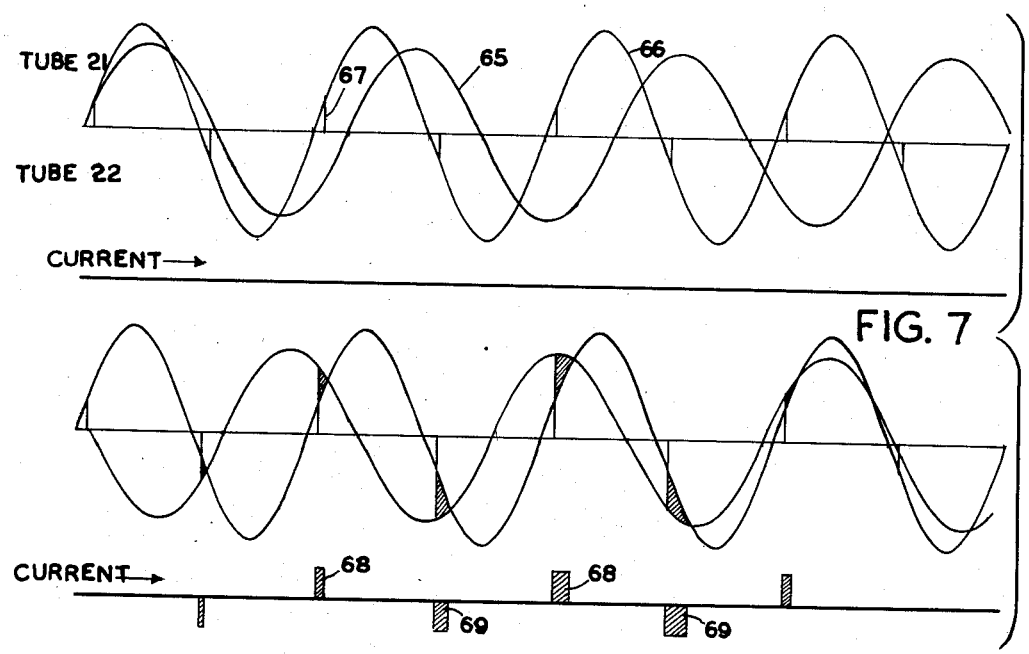
Figure 9:
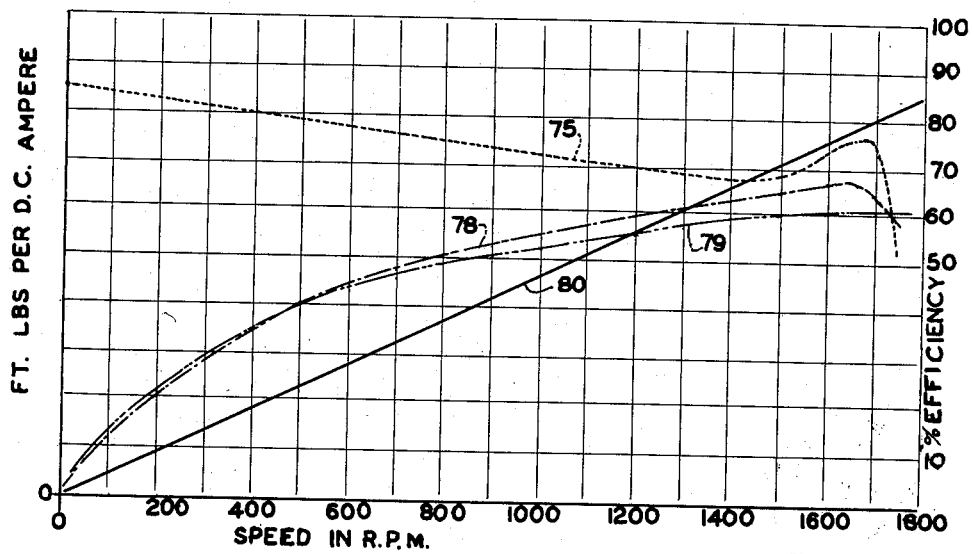

FIGURES 7 to 9 graphically illustrate various operating conditions of a motor embodying the invention.

Figure 1:
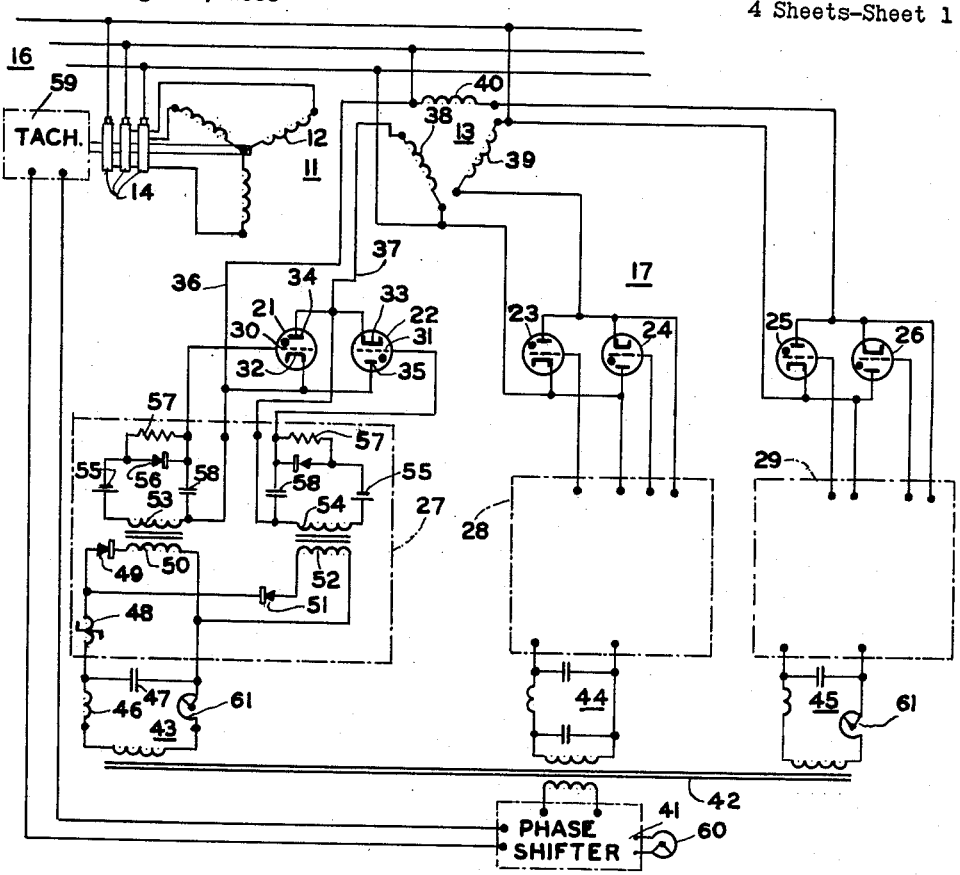
FIGURE 1 is a schematic diagram of a preferred form of the invention.

FIGURE 1 schematically shows an induction motor 11 comprising a wound rotor winding 12 and a stator winding 13. Either the rotor or stator may be considered as the primary winding and in this case the rotor has been shown as the primary winding, a 3-phase Y-connected primary connected through slip ring assembly 14 to a 3-phase supply line 16.

The secondary winding 13 may be single or multiphase and has been shown as a 3-phase winding essentially connected in delta through electronic tube translating apparatus 17. The translating apparatus 17 includes three pairs of opposed unidirectional controllable conducting devices for a total of six devices 21 to 26, inclusive. These devices are preferably ones containing an ionizing medium, such as a gas or vapor. Excitation circuits 27, 28 and 29 are provided for each of the three pairs of electronic tubes. These excitation circuits may be similar or identical and only the excitation circuit 27 has been shown completely. This excitation circuit controls the firing angle or periods of conductivity of the tubes 21 and 22 by controlling the potentials applied to the grids 30 and 31 relative to the cathodes 32 and 33. The tubes 21 and 22 have anodes 34 and 35, respectively, with the cathode 32 and anode 35 connected by a conductor 36 to one line of the 3-phase supply source 16. The anode 34 and cathode 33 are connected together and by a conductor 37 through a phase winding 38 of secondary 13 to another line of the 3-phase source 16. This effectively places the secondary phase winding 38 across one phase of the 3-phase supply source 16 in series with the two opposedly connected tubes 21 and 22. Similarly the secondary 13 has phase windings 39 and 40 connected in series across the two other phases of the supply source through the other two pairs of opposedly connected electronic tubes 23—24, and 25—26.

The excitation circuits 27—29 are controlled by a phase shifter 41 which may be single phase. The transformer 42 supplies the phase shiftable voltage to separate secondaries connected to each of the excitation circuits 27—28—29. Static phase shifters 43, 44 and 45 are provided in each of the excitation circuits to shift the phase of the applied voltage by minus 60 degrees, zero degrees, and plus 60 degrees. The phase shifter 43 includes a linear inductance 46 and a capacitor 47. The other phase shifters 44 and 45 include different combinations of inductance and capacitance to achieve the zero degree phase shift and plus 60 degree phase shift relative to the input from the main phase shifter 41.

A saturable reactor 48 is included in the output from the phase shifter 41 to supply a peaked voltage to the series combination of a pulse rectifier 49 and a pulse transformer primary 50. This peaked voltage is also supplied to another series combination of a pulse rectifier 51 and a pulse transformer primary 52 with the rectifiers 49 and 51 connected in opposition. Pulse transformer secondaries 53 and 54 transmit the pulses to the grids 30 and 31, respectively, through negative bias sources 55 and negative peak rectifiers 56. High resistances 57 are connected in parallel with the negative peak rectifiers 56 and high frequency by-pass capacitors 58 are connected between the respective grids and cathodes. The bias sources 55 normally bias the grids negatively sufficient to prevent conduction of the tubes 21 and 22 except when a pulse is supplied by the pulse transformers to fire the tubes whenever the anode potential is positive relative to the cathode potential thereof. A tachometer 59 may be used as a form of speed measuring device to measure one condition of the motor 11 and supply a signal to the phase shifter 41. By this means, the phase shifter may be controlled in output phase to control the periods of conductivities of the tubes 21—26 to control automatically the speed of the rotor 12. A speed setting potentiometer 60 connected to the phase shifter 41 may be used to control the output phase thereof to control the periods of conduction of the tubes 21—26 for manual control of the speed of the motor 11. The phase shifters 43 and 45 include potentiometers 61 for alignment of the peaks relative to the plus and minus 60 degree static phase shift. Since each of the phase shifters 43—45 supply peaks 180 degrees apart to the pulse transformers 50 and 52, the plus and minus 60 degree static phase shift is equivalent to plus and minus 120 degree phase shift because, for example, plus 60 degree phase shift and minus 120 degree phase shift are on the same line merely 180 degrees apart.

With alternating current line voltage applied to the rotor 12 as a primary winding, a rotating field is established in the motor 11. This rotating field induces a voltage in the secondary 13 which has been shown as the stator. With the tubes 21 to 26 so phased in grid excitation that there is no conduction, then there is no current flow between the line 16 and the windings of the secondary 13. In such case, the motor acts like it has an infinite impedance in the secondary windings, hence the motor is stationary. This could be with 270 degree lagging voltages applied to the grids of the tubes 21—26. As the phase shifter 41 is shifted to advance the phase, a part of each cycle of line frequency becomes available for conducting current through the tubes 21—26. This lowers the effective impedance of the secondary 13, hence the motor will accelerate.

FIGURE 7 shows voltage and current relationships for one particular condition of operation. This would be at relatively low speed approximately 15 percent of synchronous speed where the voltage induced into the secondary 13 may be represented by curve 65 and is of a lower magnitude and a lower frequency than the line voltage, one phase of which is represented by curve 66. At 15 percent speed of the rotor, the slip frequency will be 85 percent and accordingly curve 65 has about 85 percent frequency of the line voltage curve 66. At a particular firing angle relative to the line frequency as represented by the lines 67, tube 21 is capable of firing whenever the instantaneous voltage from the secondary winding 38 is positive relative to the instantaneous line voltage which is applied to the cathode 32. Conversely the oppositely connected tube 22 may be conductive on the negative half cycles when the induced voltage from secondary phase winding 38 is more negative than the line voltage applied to anode 35.

The FIGURE 7 shows that the motor secondary voltage and the line voltage start in phase and continuing the curves on the second line of FIGURE 7 these two voltages return to a substantial in-phase condition after about seven cycles. During the latter portion, the conditions for conduction through tubes 21 and 22 are met; namely, when the secondary voltage is positive relative to the line voltage for tube 21 to conduct pulses of current 68. Also on the negative half-cycles, pulses 69 of current are conducted through tube 22 when the cathode 33 is instantaneously negative relative to the anode 35.

FIGURE 8 illustrates speed vs. torque curves 71 through 74, respectively, each representing a different firing angle on the tubes 21—26. For a particular curve, the firing angle was held constant as the torque requirements were increased and as shown by curve 71, it is possible to maintain the speed substantially constant at near synchronous speed from zero to 100 percent of full load torque and even with good speed regulation out to 200 percent torque.

FIGURE 9 represents a curve 75 of speed vs. torque per ampere. This is the amperes flowing through the tubes 21—26 and shows that the foot pounds of torque developed in the rotor 12 per ampere flowing through the tubes remains substantially constant throughout the entire speed range of from zero to near synchronous speed.

FIGURE 9 further shows a curve 78 of efficiency vs. speed for the system of FIGURE 1. A curve 79 is efficiency vs. speed for a Ward Leonard system of speed control of a direct current motor. These curves show that the efficiency of the present system exceeds that of the Ward Leonard system. Curve 80 is efficiency vs. speed of a wound rotor induction motor with external controllable resistances. Comparing this curve with curve 78, it shows that the efficiency of the present system is greater than the external resistance control of a wound rotor induction motor for all speeds below about two-thirds speed. Also the very fact that this curve 78 shows higher efficiency in this low speed region is proof that the system does invert power from the secondary back to the alternating current line 16 rather than waste this energy in heat in external resistances.

The circuit of FIGURE 1 shows multiphase windings on both the primary and secondary and the multiphase winding on the primary is, of course, to establish a rotating field. The multiphase winding on the secondary 13 permits supplying multiphase power back to the alternating current supply lines 16 when the tubes 21—26 operate as an inverter as shown in FIGURE 7. The pulses of current 68 are seen to be generally opposite to the line current which, as is well known, would be slightly lagging the line voltage of the phase shown by curve 66. Since the pulses of current 68 are in phase opposition to the line current, this reduces the line current, hence there is an inversion of power and the power which is transferred across the air gap from the primary to the secondary is inverted and fed back to the alternating current supply lines 16. This permits use of a slip ring motor for variable speed and does not require the complexities or the difficulties of a commutator for a speed controllable motor.

The phase rotation of the primary and secondary is preferably opposite. This improves the zero speed and near synchronous speed regulation. This opposite phase sequence establishes a phase mismatch between at least one secondary phase and the corresponding line phase, which is true for both multi-phase and single phase secondaries.

The fact that the motor secondary voltage is less than the line voltage, plus the fact that the grids are controlled at line frequency, permits the tubes 21—26 to remain in complete control at all times of the speed of the motor and assures that the tubes will cease conduction once each cycle of line frequency.

The entire system is quite simple requiring only two tubes per secondary phase and the grid excitation circuits require little power, hence may utilize small components of low power requirement.

Figure 2:
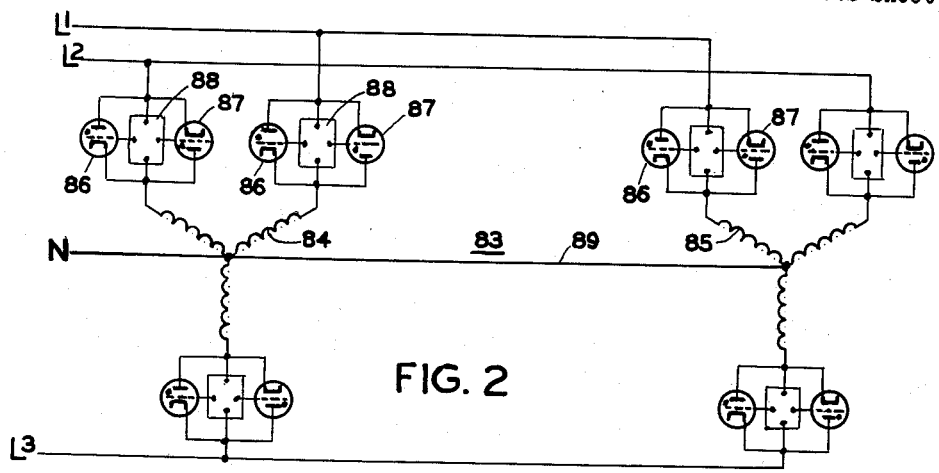

FIGURE 2 illustrates a modification of the invention wherein an induction motor 83 has a stator 84 and a rotor 85. The stator and rotor are each shown as 3-phase Y-connected windings with each phase being connected through a pair of opposed unidirectional conducting devices 86 and 87. Grid excitation circuits 88 are supplied which may be the same as the excitation circuits 27—29 of FIGURE 1. The rotor and stator windings are connected in phase opposition. If the tubes 86 and 87 connected to the stator 84 are phased to a full conducting condition, then the stator 84 becomes fully energized from the alternating current line and hence becomes the primary winding of the motor 83. Accordingly controlling the phase angle and hence the conductivity of the tubes 86 and 87 connected to the rotor 85 will permit this rotor to act as a secondary winding and hence control the inversion of power returned to the alternating current line. Under these conditions, the motor will rotate in a given direction. By controlling the conduction periods of the tubes 86 and 87 connected to the stator winding 84 and rendering fully conductive the tubes connected to the rotor 85 will establish the opposite condition; namely, that the rotor 85 is the primary, stator 84 is the secondary, and the motor will rotate in the opposite direction at a speed determined by the phase of conduction through the tubes 86 and 87 connected to this stator 84. This circuit of FIGURE 2 thus effects a reversible alternating current motor which is electronically reversible and one which is controllable in speed from zero to near synchronous speed in each direction. As the tubes 86 and 87 conduct, alternating current flows through the neutral line 89 and the particular one of the three lines of the 3-phase source of the proper polarity.

Figure 3:
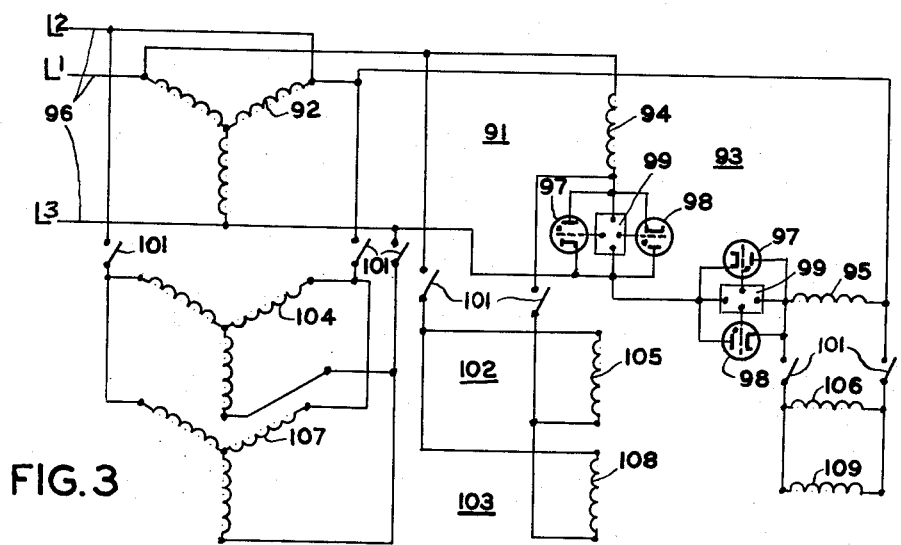

FIGURE 3 illustrates an induction motor 91 having a primary winding 92 and a secondary winding 93. This secondary winding has been shown as a 2-phase winding comprising phase windings 94 and 95. The primary winding 92 is shown as a 3-phase Y-connected winding and either the primary or secondary may be the stator with the other being the rotor. The primary winding 92 is connected to a 3-phase line 96 and the secondary phase windings 94 and 95 are connected to this line 96 through different sets of opposed unidirectional current connecting devices or tubes 97 and 98. Grid excitation circuits 99 are again supplied to control the phase of excitation of these tubes 97 and 98.

Upon energization of the primary winding 92, a rotating field is set up in the motor 91 and this induces 2-phase voltages in the secondary 93. These 2-phase currents may invert enregy and return it to the 3-phase supply line 96 through the oppposedly connected tubes. Since tubes 97 and 98 will conduct opposite polarity pulses of current on lines 1 and 3 for phase winding 94 and on lines 2 and 3 for phase winding 95, this shows that it is not essential that the number of the phases of the secondary be equal to the number of phases of the primary winding.

FIGURE 3 also includes a number of switches 101 which may be ganged together if desired and when closed connect motors 102 and 103 in parallel with motor 91. Motor 102 has a primary 104 and secondary 2-phase windings 105 and 106. Motor 103 has a primary 107 and secondary 2-phase windings 108 and 109. All the secondary windings for all three motors are therefore connected in parallel and are connected in series through the respective pair of tubes to the alternating current supply line 96. These three motors might be three motors on one machine such as a conveyor belt where it is desired to operate the motors exactly in synchronism. Since the two pairs of tubes 97 and 98 are used to control the pulses of current flowing between the alternating current line 96 and the secondary windings 94, 95, 105, 106, 108 and 109, this assures that the rotors of these three motors will remain in synchronism for any desired speed. A double advantage is therefore gained in that the four electronic tubes may control more than one motor with no increase in complexity of control circuits and additionally synchronous operation of a plurality of motors is achieved. The paralleling of the plurality of motors has been shown in connection with 2-phase secondaries but it will be obvious to those skilled in the art that one may achieve the same results by paralleling motors having secondary windings of any number of phases as long as the secondary windings are substantially identical for each of the paralleled machines.

Figure 4:
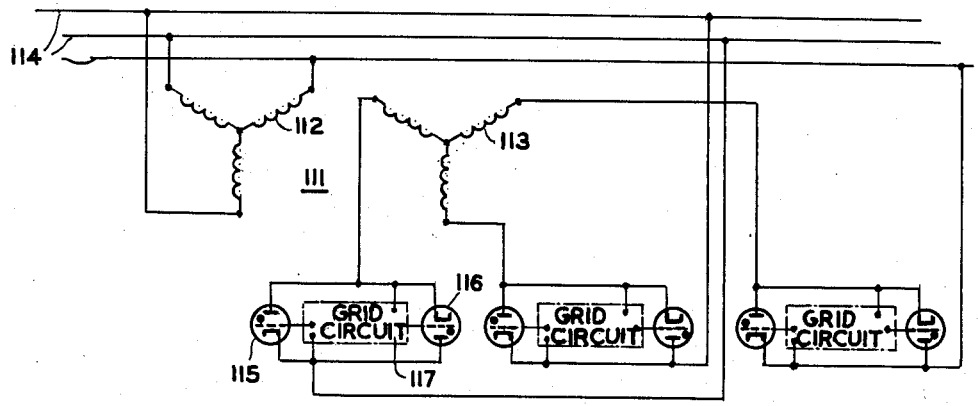

FIGURE 4 shows an induction motor 111 having a primary winding 112 and a secondary winding 113, either of which may be a wound rotor. The primary winding 112 is connected directly to the alternating supply line 114 and the secondary winding 113 is connected to this line 114 through pairs of opposed tubes 115 and 116 controlled by grid excitation circuits 117. Each of the primary and secondary windings 112 and 113 have been shown as 3-phase Y-connected windings and since the secondary winding 113 has no neutral connection, the grid excitation circuit 117 differs from the grid excitation circuit 27 of FIGURE 1 by having an additional pulse transformer primary in series with each pulse rectifier. The secondaries of these additional pulse transformers are cross-connected to the other grid circuits of the system so that two tubes may fire in series. For example, the tube having an anode connected to one secondary phase and the tube having a cathode connected to another secondary phase would fire at the same time to provide a path between two different lines of the alternating current supply 114. This grid excitation circuit may be similar to that shown in Patent No. 2,758,251 of Kenneth L. Shrider and Andrew J. Humphrey, issued August 7, 1956. The concurrent firing of tubes in series progresses as the phase rotation of the induced voltage makes successive phase windings of the secondary 113 of the proper polarity.

It will be noted that in this circuit of FIGURE 4, there are two phase windings of the secondary which are connected in series and accordingly this places two tubes, one of each pair, in series across any given phase of the supply line. Accordingly, it will be understood by those skilled in the art that a 2-phase secondary winding or any other multiphase secondary winding wherein two of the phase windings of the secondary are connected in series, and in series with two pairs of tubes to the alternating current line, a tube of each pair may be caused to fire concurrently in order to conduct current between the secondary winding and the alternating current line.

Figure 5:
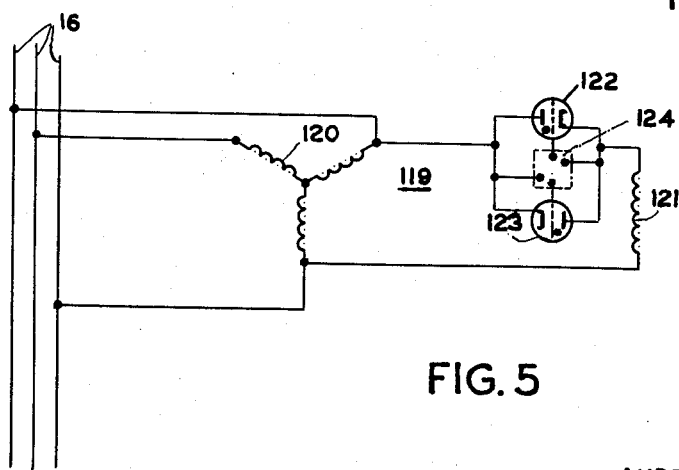
FIGURES 2 to 6 show schematic diagrams of modified forms of the invention.

FIGURE 5 shows a simple circuit having a motor 119 which includes a primary winding 120 and a secondary winding 121. The primary winding has been illustrated as a 3-phase Y-connected winding connected to the alternating current supply line 16 and the secondary winding 121 has been illustrated as a single phase winding. One end of this winding is connected to one line of the alternating current source and the other end of this winding is connected through a pair of opposed tubes 122 and 123 controlled by a grid excitation circuit 124. In a manner similar to the preceding circuits, the rotating field of the primary 120, whether it be rotor or stator, induces a voltage in the secondary winding 121 and this voltage may invert power to the supply line 16 through the tubes 122 and 123. This circuit shows that it is not essential to have a multiphase winding in the secondary and it also shows that the control of a wound rotor induction motor may be effected with a very simple circuit utilizing only two tubes or other controllable conduction devices.

Figure 6:
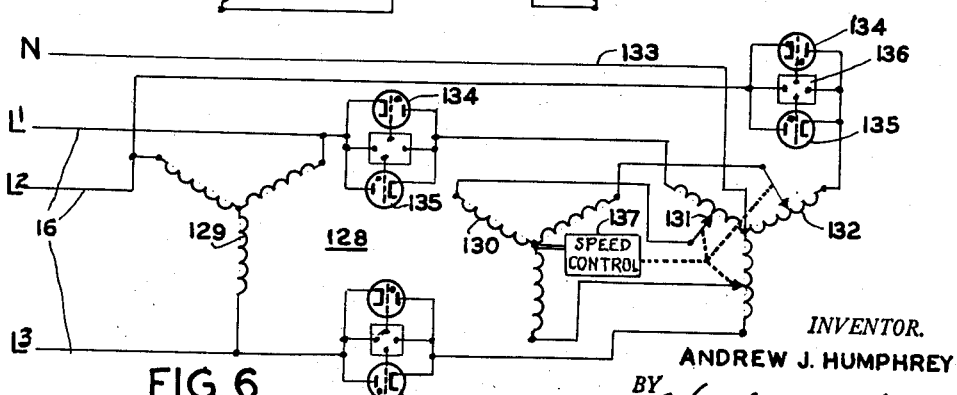

FIGURE 6 shows an induction motor 128 having a multiphase primary winding 129 connected to the alternating current supply line 16 and having a 3-phase secondary winding 130. This secondary is shown as being Y-connected and the ends of the phase windings are connected to taps 131 of a Y-connected 3-phase auto transformer 132. The center of this auto transformer 132 is connected to the neutral line 133 of the alternating current supply source 16. The ends of the auto transformer windings are connected through opposed tubes 134 and 135 to the alternating current line 16. These tubes again may be controlled by grid circuits 136. The secondary 130 has been shown as the rotor and is connected to a speed control 137 which, for example, may be a tachometer generator and a motor drive to move the auto transformer taps 131. Such speed control 137 may also be similar to that shown in FIGURE 1 to automatically control the speed of the motor 128. As the induction motor 128 accelerates, the slip frequency decreases, and hence not only does the frequency of the induced voltage decrease but also its amplitude decreases. Accordingly the speed control 127 is controlled to increase the voltage from the ends of the auto transformer 132 as the speed increases to counteract this otherwise normal effect. This increase of voltage applied to the tubes 134 and 135 gives the advantage of greater efficiency at the higher speeds.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention hereinafter claimed.

What is claimed is:

1. An induction dynamoelectric machine, comprising, primary and secondary winding means, one of said winding means being a wound rotor winding, means for connecting said primary winding means to alternating voltage source terminal means to establish a rotating field for said machine, only two unidirectional conducting devices per secondary phase, means connecting at least part of said secondary winding means through said two unidirectional conducting devices to said terminal means with said two devices being in opposition relative to said terminal means, at least one of said devices being controllable to control the amount of current passed therethrough, and means controlling the conduction of said at least one controllable conducting device at only the frequency of said source to control said machine.

2. An induction motor, comprising, primary and secondary windings, one of said windings being a wound rotor winding, said primary winding being a multiphase winding, means for connecting said primary winding to multiphase source terminal means for energization of said motor, only two opposedly connected controllable conduction devices per secondary phase, means connecting said secondary winding through said opposed controllable conduction devices to said source terminal means, and means controlling the conduction of said controllable conduction devices at only the frequency of said source to control the amount of energy returned to said source terminal means to act as a variable impedance on said secondary winding to control the speed of said motor.

3. An induction motor, comprising, primary and secondary winding means, one of said winding means being a wound rotor winding, each said primary and secondary winding means being a multiphase winding, only one pair of unidirectional controllable conducting devices per phase of said secondary winding means, means connecting each phase of said secondary winding means through a different pair of unidirectional conducting devices to multiphase source terminals with the two devices in each pair being in opposition, means for connecting said primary winding means to said source terminals in a phase sequence opposite to the connection of said secondary winding means for energization of said motor, the voltage of said source exceeding the voltage induced in said secondary winding means, and means controlling the conduction of said unidirectional conducting devices at only the frequency of said source to control the amount of energy returned to said source terminals.

4. An induction motor, comprising, a three phase primary and a three phase secondary winding, one of said windings being a wound rotor winding, means for connecting said primary winding to three phase source terminals for energization of said motor, three pairs of oppositely connected controllable conduction devices, means connecting each phase of said secondary winding through a different pair of said opposed controllable conduction devices to said source terminals in opposite phase relation to said primary winding, said primary winding capable of developing a greater voltage thereacross than said secondary winding, and means controlling the conduction of said controllable conduction devices at the frequency of said source to control the amount of energy returned to said source terminals to act as a variable impedance on said secondary winding to control the speed of said motor.

5. An induction motor, comprising, three phase primary and secondary windings, one of said windings being a wound rotor winding, only three pairs of unidirectional controllable conducting devices, means connecting each phase of said secondary winding through a different pair of unidirectional conducting devices to three phase source terminals with said two devices in each pair being in opposition, means for connecting said primary winding to said source terminals in a phase sequence opposite to the connection of said secondary winding for energization of said motor, the alternating voltage applied from said source through said devices to said secondary winding exceeding the induced voltage of said secondary winding, and means controlling the conduction of said controllable conducting device at only the frequency of said source to control the amount of energy returned to said source terminals to control said motor.

6. An induction motor, comprising, a three phase wound rotor primary winding and a three phase secondary winding, means for connecting said primary winding to three phase source terminals for energization of said motor, three pairs of oppositely connected controllable conduction devices, means connecting each phase of said secondary winding through a different pair of said opposed controllable conduction devices to said source terminals in a delta connection in opposite phase relation to said primary winding, said primary winding being energized at a greater voltage than the voltage induced in said secondary winding, excitation means controlling the conduction of said controllable conduction devices at the frequency of said source, and tachometer feed-back means responsive to the speed of said motor to control said excitation means.

7. A reversible induction motor, comprising, a three phase primary and a three phase secondary winding, one of said windings being a wound rotor winding, first and second sets of three pairs of oppositely connected controllable conduction devices, means connecting each phase of said primary winding through a different pair of said first set of devices to three phase source terminals, means connecting each phase of said secondary winding through a different pair of said second set of devices to said source terminals in opposite phase relation to said primary winding, and means controlling the conduction of said controllable conduction devices at the frequency of said source to control said motor.

8. A reversible induction motor, comprising, a three phase primary and a three phase secondary winding, one of said windings being a wound rotor winding, first and second sets of three pairs of opposedly connected controllable conduction devices, means connecting each phase of said primary winding through a different pair of said first set of devices to three phase source terminals, means connecting each phase of said secondary winding through a different pair of said second set of devices to said source terminals in opposite phase relation to said primary winding, means establishing full conduction of one of said sets of devices and controlled conduction of the other of said sets of devices for rotation of said motor in one direction, and means establishing full conduction of said other of said sets of devices and controlled conduction of said one of said sets of devices for rotation of said motor in the opposite direction.

9. An induction motor, comprising, a three phase primary and a two phase secondary winding, one of said windings being a wound rotor winding, means for connecting said primary winding to three phase source terminals for energization of said motor, two pairs of opposedly connected controllable conduction devices, means connecting each phase of said secondary winding through a different pair of said opposed controllable conduction devices to said source terminals, said primary winding capable of developing a greater voltage thereacross than said secondary winding, and means controlling the conduction of said controllable conduction devices at the frequency of said source to control said motor.

10. A motor system, comprising, a plurality of induction motors each having multiphase primary and secondary windings, one of said windings being a wound rotor winding, means connecting in parallel the corresponding phases of all said secondary windings, pairs of unidirectional controllable conducting devices corresponding in number to the number of phases on one of said secondary windings, means connecting each group of paralleled secondary phase windings through a different pair of unidirectional conducting devices to multiphase source terminals with said two devices in each pair being in opposition, means for connecting in parallel the corresponding phases of all said primary windings to said source terminals for energization of said motor, and means controlling the conduction of said controllable conducting devices at the frequency of said source to control said paralleled motors.

11. An induction motor, comprising, multiphase primary and secondary windings, one of said windings being a wound rotor winding, pairs of unidirectional controllable conducting devices, means connecting each phase of said secondary winding through a different pair of unidirectional conducting devices to multiphase source terminals with said two devices in each pair being in opposition, at least two of said secondary phase windings being connected in series, means for connecting said primary winding to said source terminals for energization of said motor, and means controlling the conduction of said controllable conducting devices for simultaneous conduction of two serially connected devices to control said motor.

12. An induction motor, comprising, a multiphase primary winding and a single phase wound rotor secondary winding, a pair of unidirectional controllable conducting devices, means connecting said secondary winding through said pair of unidirectional conducting devices to one phase of multiphase source terminals with said two devices being in opposition, means for connecting said primary winding to said source terminals for energization of said motor, and means controlling the conduction of said controllable conducting devices to control said motor.

13. An induction motor, comprising, multiphase primary and secondary windings, one of said windings being a wound rotor winding, an autotransformer having the same phase winding configuration as said secondary winding, movable taps on said autotransformer phase windings, means connecting each phase of said secondary winding to a different movable tap, pairs of unidirectional controllable conducting devices, means connecting each phase winding of said autotransformer through a different pair of unidirectional conducting devices to multiphase source terminals with said two devices in each pair being in opposition, means for connecting said primary winding to said source terminals in a phase sequence opposite to the connection of said secondary winding for energization of said motor, and means controlling the conduction of said controllable conducting devices to control said motor.

14. An induction motor, comprising, primary and secondary winding means, one of said winding means being a wound rotor winding, said primary winding means being multiphase, only two unidirectional conducting devices per secondary phase, means connecting at least part of said secondary winding means through said two unidirectional conducting devices to multiphase source terminal means with said two devices being in opposition relative to said source terminal means, means for connecting said primary winding means to said terminal means in a phase sequence different from the connection of said secondary winding means for energization of said motor, at least one of said devices being controllable to control the amount of current passed therethrough, and means controlling the conduction of said at least one controllable conducting device at only the frequency of said source to control the amount of energy returned to said source terminals to control the speed of said motor.

15. An induction motor, comprising, primary and secondary winding means, one of said winding means being a wound rotor winding, said primary winding means being a multiphase winding, at least one pair of unidirectional controllable conducting devices, multiphase voltage source terminals, means connecting said secondary winding means through said pair of unidirectional conducting devices to at least some of said voltage source terminals with the two devices in said pair being in opposition, and means for connecting said primary winding means to at least some of said source terminals in a phase sequence different from the connection of said secondary winding means for energization of said motor.

16. An induction motor, comprising, primary and secondary winding means, one of said winding means being a wound rotor winding, said primary winding means being a multiphase winding, at least one pair of unidirectional controllable conducting devices, multiphase voltage source terminals, means connecting said secondary winding means through said pair of unidirectional conducting devices to at least some of said voltage source terminals with the two devices being in opposition, means for connecting said primary winding means to at least some said source terminals for energization of said motor, and the voltage of said source exceeding the voltage induced in said secondary winding means.

17. An induction motor, comprising, primary and secondary winding means, one of said winding means being a wound rotor winding, said primary winding means being a multiphase winding, at least one pair of unidirectional controllable conducting devices, multiphase voltage source terminals, means connecting said secondary winding means through said pair of unidirectional conducting devices to at least some of said source terminals with the two devices being in opposition, means for connecting said primary winding means to at least some of said source terminals in a phase sequence different from the connection of said secondary winding means for energization of said motor, the voltage of said source exceeding the voltage induced in said secondary winding means, and means controlling the conduction of said unidirectional conducting devices to control said motor.

18. An induction motor, comprising, primary and secondary winding means, one of said winding means being a wound rotor winding, said primary winding means being a multiphase winding, only one pair of unidirectional controllable conducting devices per phase of said secondary winding means, multiphase voltage source terminals, means connecting said secondary winding means through said pair of unidirectional conducting devices to at least some of said source terminals with the two devices being in opposition to transfer energy to said terminals, means for connecting said primary winding means to at least some of said source terminals in a phase sequence different from the connection of said secondary winding means for energization of said motor, and means controlling the conduction of said unidirectional conducting devices to control the amount of energy transferred between said motor and said terminals.

19. An induction motor, comprising, primary and secondary winding means, one of said winding means being a wound rotor winding, said primary winding means being a multiphase winding, only one pair of unidirectional controllable conducting devices per phase of said secondary winding means, multiphase voltage source terminals, means connecting said secondary winding means through said pair of unidirectional conducting devices to at least some of said source terminals with the two devices being in opposition to transfer energy to said terminals, means for connecting said primary winding means to at least some of said source terminals in a phase sequence different from the connection of said secondary winding means for energization of said motor, the voltage of said source exceeding the voltage induced in said secondary winding means, and means controlling the conduction of said unidirectional conducting devices to control the amount of energy transferred between said motor and said terminals.

20. An induction motor comprising, multiphase source terminal means, a primary winding and a secondary winding, means connecting said primary winding to said source terminal means to induce a rotating flux field into said secondary winding, only one pair of unidirectional controllable conducting devices per secondary phase, means connecting said secondary winding through said pair of unidirectional devices to said source terminal means such that there is always a phase mismatch between at least one secondary phase and the corresponding line phase, and means for controlling conduction of said unidirectional conducting devices at only source frequency to control the interchange of energy between said source terminal means and said secondary winding.

References Cited in the file of this patent

UNITED STATES PATENTS

| | | |
|---|---|---|
| 2,236,984 | Alexanderson | Apr. 1, 1941 |
| 2,264,854 | Mittag | Dec. 2, 1941 |
| 2,650,335 | Leyton | Aug. 25, 1953 |